A. J. SAYERS.
UNIVERSAL AUTOMATIC CAR LOCK FOR ROTARY DUMPS.
APPLICATION FILED DEC. 28, 1917.
1,333,345. Patented Mar. 9, 1920.
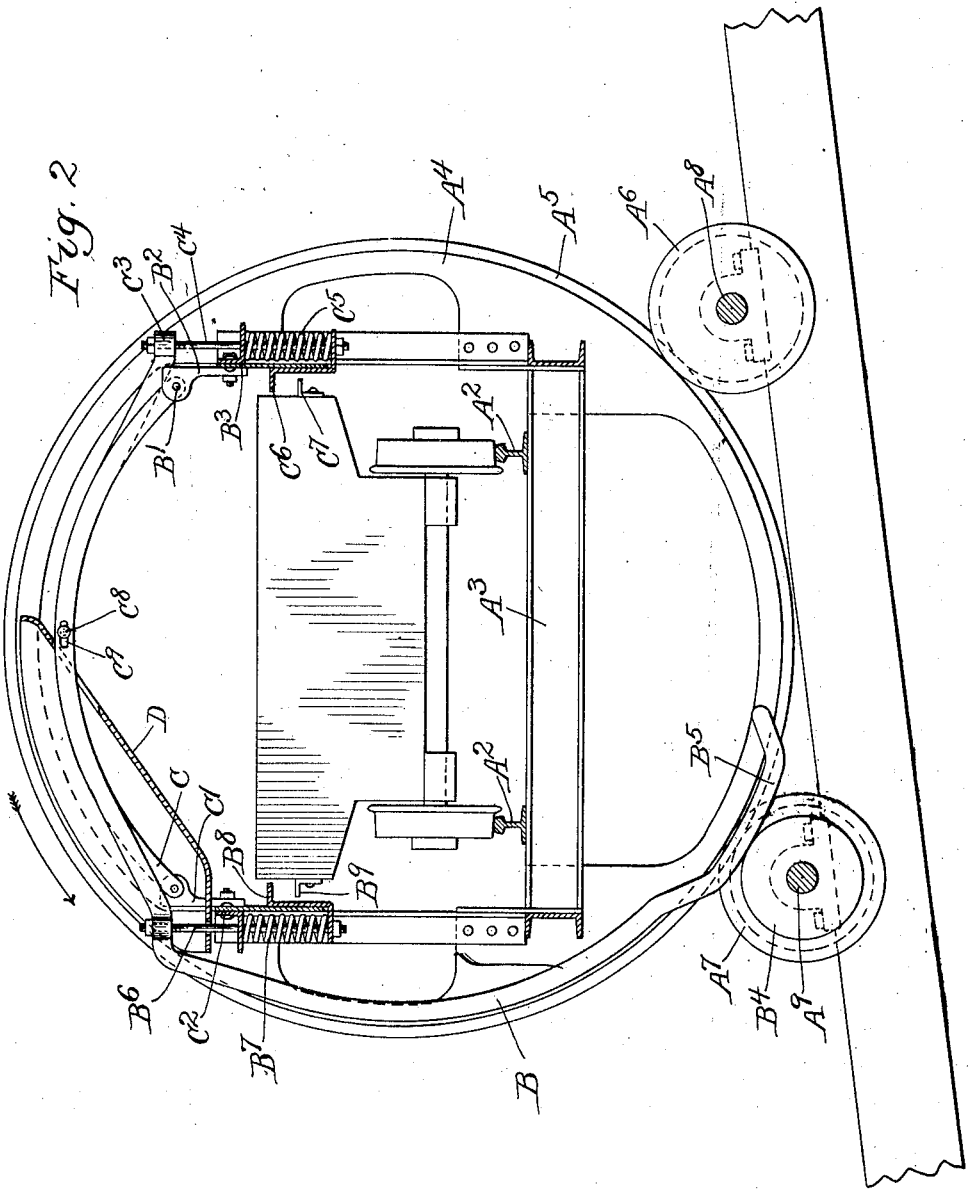
Witness.
Edward T. Wray
Inventor.
Albert J. Sayers
by Parker & Carter
Attorneys.

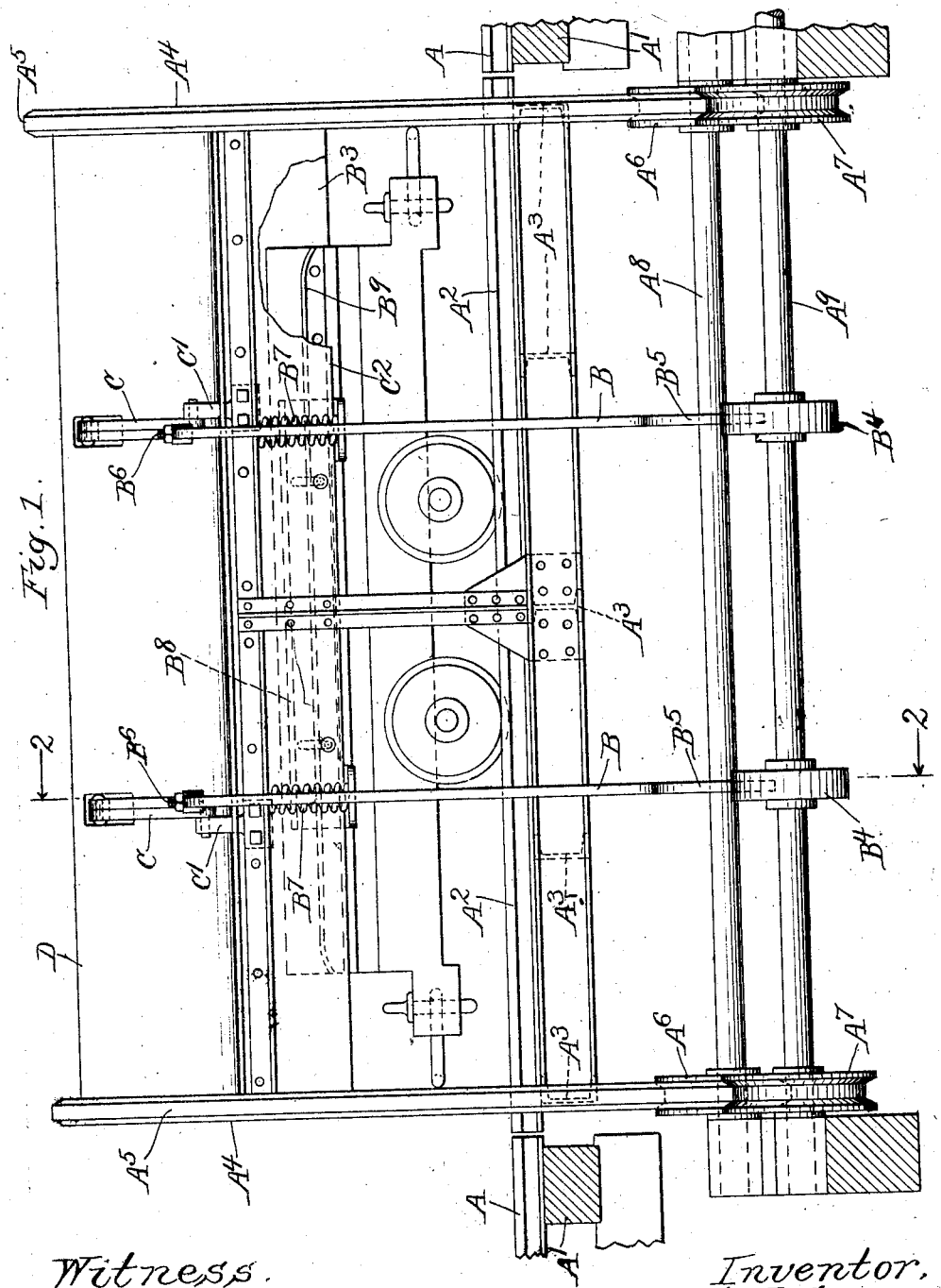

UNITED STATES PATENT OFFICE.

ALBERT J. SAYERS, OF CHICAGO, ILLINOIS, ASSIGNOR TO LINK-BELT COMPANY, OF CHICAGO, ILLINOIS, A CORPORATION OF ILLINOIS.

UNIVERSAL AUTOMATIC CAR-LOCK FOR ROTARY DUMPS.

1,333,345.   Specification of Letters Patent.   Patented Mar. 9, 1920.

Application filed December 28, 1917. Serial No. 209,225.

*To all whom it may concern:*

Be it known that I, ALBERT J. SAYERS, a citizen of the United States, residing at Chicago, in the county of Cook and State of Illinois, have invented a certain new and useful Improvement in Universal Automatic Car-Locks for Rotary Dumps, of which the following is a specification.

My invention relates to improvements in universal automatic car lock for rotary dumps and has for one object to provide means for automatically clamping the cars in position upon the rails so that they may not leave the rail when the dump is rotated. Another object is to provide means automatically responsive to and operative in coordination with the dumping rotation of the dump itself for locking the car against movement which would tend to bring the car wheels out of contact with the rail. Another object is to provide such locking means as will automatically adjust themselves to slight variations in height of the car, the diameter of the wheel and the like so that any car which operates with the dump at all will be firmly and rigidly held in position when it is being dumped. Other objects will appear from time to time in the specification.

My invention is illustrated more or less diagrammatically in the accompanying drawing wherein—

Figure 1 is a side elevation;

Fig. 2 is a section along the line 2—2 of Fig. 1.

Like parts are indicated by like characters in the drawings.

A, A represents the tipple track resting upon the ordinary cross ties $A^1$, $A^1$ supported from a suitable support by any suitable means not here shown. This track is interrupted to provide position for the dumping cage which I am about to describe.

$A^2$, $A^2$ is a dumping track mounted on the dumping cage in register with the track A, A. This track rests upon cross beams $A^3$, $A^3$ which cross beams in turn are anchored in the annular frame members $A^4$, $A^4$, one forming either end of the cage. These members $A^4$ are bounded by annular tracks $A^5$ which ride upon the supporting wheels $A^6$, $A^7$, on the shafts $A^8$, $A^9$. The shaft $A^9$ is continuous to a suitable source of power not here shown, whereby rotation of the supporting wheels in engagement with the annular track will cause a rotation of the dumping cage and dump the car.

Any ordinary means may be provided for manipulating and controlling the cage itself, for starting and stopping it, and for driving it, and I have not illustrated these means here as they form no part of my invention and may be of any suitable obvious form. With the parts as shown the car can be run upon the track in the usual manner and dumped in the usual manner so long as the car is held in position on the track, and it is the means for holding it on the track which I am about to describe, which form the subject matter of my present application.

B is a master lever. It is generally curved in shape to conform to the curvature of the dumping cage. It is pivoted as at $B^1$ on a bracket $B^2$ supported on a longitudinal stay $B^3$ extending between the ends of the dumping cage. This lever B extends clear around the cage through an angle of about 180° being everywhere nearer the center of rotation of the cage than the cam roller $B^4$ except where it is provided with an outwardly bent cam engaging end or member $B^5$. The arrangement is such that when in the upright position shown in Fig. 2, the lever is rotated in a clockwise position about its pivot point to cause it to lift up on the link $B^6$ compressing the spring $B^7$ and moving the car engaging hook or flange $B^8$ up out of register and out of engagement with the flange $B^9$ on the car.

This movement of the master lever B also causes the rotation of an auxiliary locking lever C which is pivoted on the bracket $C^1$ on a cross member $C^2$ and extends around to terminate in a loop $C^3$ engaging a link $C^4$ adapted to compress the spring $C^5$ and lift the hook $C^6$ away from a flange $C^7$ on the opposed side of the mine car. The pin $C^8$ mounted in the lever C and engaging a slot $C^9$ on the lever B causes the lever C to rotate in unison with the lever B.

It will be observed that all that the rotation of this master lever accomplishes while it is engaged by the cam $B^4$ is to compress the two holding springs and lift them up so that the parts carried by them are disengaged from the car a sufficient distance to make sure that the car will not be contacted by them and will not be interrupted by them as it travels on to the dump. I have shown the flanges B⁹ and C⁷ on the car continuous, and the hooks C⁸ and C⁶ comparatively short. They might be longer, and the flanges on the car might be shorter, it being sufficient that when the car is in the dumping position there be a flange or projection thereon in register with the spring carried hook. The relation of the parts is such that when the lever is released by the cam the springs pressing upon their abutments as indicated on one side, and on the hook supporting carriage on the other, exert a pressure on the car to powerfully clamp it against the track rails so that the cars cannot be released by the weight of gravity.

D is a dumping apron and it is carried by the dumping cage so that the coal or other material as it is dumped from the car may be guided and discharged in the proper manner.

I have shown two clamping levers. There might be one only, or there might be more than two. I have shown an arrangement where the two are balanced well toward either side of the car so that the load is evenly distributed, but other means might be provided and other arrangements might be shown for distributing the load, or the parts might be differently sized or proportioned, and I wish therefore that my drawings be regarded as in a sense diagrammatic.

The use and operation of my invention are as follows:—

The car is run on the rotary cage which forms the rotary car dump. With the parts in position shown in full lines the car is free to move along the track without interference. When the dump commences to rotate there is a considerable arc through which rotation may take place before there is any tendency for the car wheels to leave the track. Rotation beyond that point, however, will make the car tip off the track. This gives a certain angle of movement during which the automatic mechanism has time for its operation. As the cage rotates the cam engaging portion of the locking lever disengages from the cam holding springs. They thrust the holding clamping members down against the angle bars on the upper two opposed sides of the cars and the springs by their strength rigidly clamp and lock the cars against the rail. These springs do not have to be strong enough, of course, to lift the entire car and load because as they go in action the contents of the car gradually commences to spill out and as the car turns farther and farther over more and more of the contents is discharged until when the car is completely upside down the car is emptied and the springs are supporting only the weight of the car itself. The cage continues its rotation in the same direction gradually returning the car to the upright position. As the end of the excursion is reached the cam engaging part of the lever rides on the cam and the circular locking lever is rotated thus compressing the car supporting springs and lifting the car holding hooks out of engagement with the latch members or angle bar members on the car body thus leaving the car free to be withdrawn from its position or move along the track through the dumping cage as the case may be.

I claim:

1. The combination with a rotary car dump of means for automatically locking the car in position thereon during the dumping movement and spring operated means associated with said locking means for automatically compensating for variations in car dimensions, said locking and compensating means operating along an axis perpendicular to the plane of the car dump tracks.

2. The combination with a rotary car dump of means for automatically locking the car in position thereon during the dumping movement and means associated with said locking means for automatically compensating for variations in car dimensions, said means comprising car engaging spring adjusted hooks operating along an axis perpendicular to the plane of the car dump tracks.

3. The combination with a rotary car dump of means for automatically locking a car in position thereon during the dumping movement comprising a car engaging member, yielding means for thrusting it perpendicularly downward against the car to clamp the car on the track and means operative when the car is in an upright position for compressing said yielding means and disengaging the car engaging member, said means comprising a lever on the car dump, a cam member thereon and a fixed roller adapted to engage the cam member only when the car is in a substantially upright position.

4. The combination with a rotary car dump of means for automatically locking a car in position thereon during the dumping movement comprising a car engaging member, yielding means for thrusting it perpendicularly downward against the car to clamp the car on the track and means operative when the car is in an upright position for compressing said yielding means and disengaging a lever on the car dump, a cam member thereon and a fixed roller adapted to engage the cam member only when the car is in a substantially upright position and a connection interposed between said lever and the car engaging member independent of such yielding means.

5. The combination with a rotary car dump of means for automatically locking a car in position thereon during the dumping movement comprising a car engaging member, yielding means for thrusting it perpendicularly downward against the car to clamp the car on the track and means operative when the car is in an upright position for compressing said yielding means and disengaging the car engaging member, there being a plurality of said car engaging members at widely separated points to steady and position the car and means for operating all of said car engaging members in unison.

6. The combination with a rotary car dump of means for automatically locking a car in position thereon during the dumping movement comprising a car engaging member, yielding means for thrusting it perpendicularly downward against the car to clamp the car on the track and means operative when the car is in an upright position for compressing said yielding means and comprising a lever on the car dump, a cam member thereon and a fixed roller adapted to engage the cam member only when the car is in a substantially upright position, there being a plurality of said car engaging members at widely separated points to steady and position the car and means for operating all of said car engaging members in unison.

7. The combination with a rotary car dump of means for automatically locking a car in position thereon during the dumping movement comprising a car engaging member, yielding means for thrusting it perpendicularly downward against the car to clamp the car on the track and means operative when the car is in an upright position for compressing said yielding means and disengaging a lever on the car dump, a cam member thereon and a fixed roller adapted to engage the cam member only when the car is in a substantially upright position and a connection interposed between said lever and the car engaging member independent of such yielding means, there being a plurality of said car engaging members at widely separated points to steady and position the car and means for operating all of said car engaging members in unison.

8. The combination with a rotary car dump of means for automatically locking a car thereon during the dumping movement comprising a car engaging member, yielding means for thrusting it perpendicularly downward against the car to clamp the car on the track, a master lever and a direct connection between it and one of said car engaging members, a lever connection between it and the other car engaging member, means for rotating said lever to move the car engaging members into the inoperative position when the car is in a substantially upright position.

9. The combination with a rotary car dump of means for automatically locking a car thereon during the dumping movement comprising a car engaging member, yielding means for thrusting it perpendicularly downward against the car to clamp the car on the track, a master lever and a direct connection between it and one of said car engaging members, a lever connection between it and the other car engaging member, means for rotating said lever to move the car engaging members into the inoperative position when the car is in a substantially upright position, said means comprising a cam removed from the dump, a cam member thereon and a cam member on the lever adapted to contact said roller.

10. The combination with a rotary car dump of means for automatically locking the car in position thereon during the dumping movement comprising a car engaging member, means for operating it downwardly against the car to press the car down against the rails, said locking means adapted to compensate for variations in dimensions.

11. The combination with a rotary car dump of means for automatically locking the car in position thereon during the dumping movement comprising a car engaging member, means for operating it downwardly against the car to press the car down against the rails, said locking means adapted to compensate for variations in dimensions, a control lever and a connection between it and the car engaging means and means for rotating said control lever to disengage said means from the car when the car is in a substantially upright position.

12. The combination with a rotary car dump of means for automatically locking the car in position thereon during the dumping movement, said means comprising a plurality of car engaging members, a primary locking lever directly controlling one of them, a second lever pivoted directly to the first lever controlling the other, and means for automatically controlling the primary locking lever.

13. The combination with a rotary car dump of substantially circular cross section, of means for automatically locking the car in position thereon during the dumping movement, said means comprising a plurality of car engaging members, a primary arcuate locking lever directly controlling one of them, a second arcuate lever, pivoted to the first lever, controlling the other locking member, and means for automatically controlling the primary locking lever.

14. The combination with a rotary car dump of substantially circular cross section, of means for automatically locking the car in position thereon during the dumping movement, said means comprising a plurality of car engaging members, a primary arcuate locking lever directly controlling one of them, a second arcuate lever, pivoted to the first lever, controlling the other locking member, and means for automatically controlling the primary locking lever, said arcuate member disposed substantially about the perimeter of the dumping member.

15. The combination with a rotary car dump of means for automatically locking the car in position thereon during the dumping movement, said means comprising a plurality of vertically movable car engaging members, means for normally holding them out of engagement with the car, and yielding means adapted to be released by the rotation of the dump, for forcing them perpendicularly downward against the car.

16. The combination with a rotary car dump of means for automatically locking the car in position thereon during the dumping movement, said means comprising a plurality of movable car engaging members, yielding means for forcing them perpendicularly downward against the car, means for normally resisting said yielding means, comprising a cam lever mounted on the dump, a direct connection between said cam lever and the car engaging member, said lever adapted to be released by the rotation of the dump.

17. The combination with a rotary car dump of means for automatically locking the car in position thereon during the dumping movement, comprising a car engaging member and yielding means for forcing it perpendicularly downward against the car, said means operative only while the dump is in rotation.

18. The combination with a rotary car dump, of means for automatically locking the car in position thereon during the dumping movement, comprising a car engaging member, and yielding means for forcing it perpendicularly downward against the car, a lever normally holding the car engaging member out of contact with the car, said lever adapted to release the car engaging member during the rotation of the dump.

19. The combination with a rotary car dump of means for automatically locking the car in position thereon during the dumping movement, said means comprising car engaging members and yielding means for forcing said members downwardly against the car along an axis perpendicular to the plane defined by the car tracks.

20. The combination with a rotary car dump of means for automatically locking the car in position thereon during the dumping movement, said means comprising car engaging members and yielding means controlled by the rotation of the dump for forcing said members downwardly against the car along an axis perpendicular to the plane defined by the car tracks.

21. The combination with a rotary car dump of means for automatically locking the car in position thereon during the dumping movement, said means comprising car engaging members and springs for forcing said members downwardly against the car along an axis perpendicular to the plane defined by the car tracks.

22. The combination with a rotary car dump of means for automatically locking the car in position thereon during the dumping movement, said means comprising car engaging members and springs controlled by the rotation of the dump for forcing said members downwardly against the car along an axis perpendicular to the plane defined by the car tracks.

In testimony whereof I affix my signature in the presence of two witnesses this 19th day of December, 1917.

ALBERT J. SAYERS.

Witnesses:
  JOHN H. D. PETERSEN,
  E. G. EWART.